Figure 1:
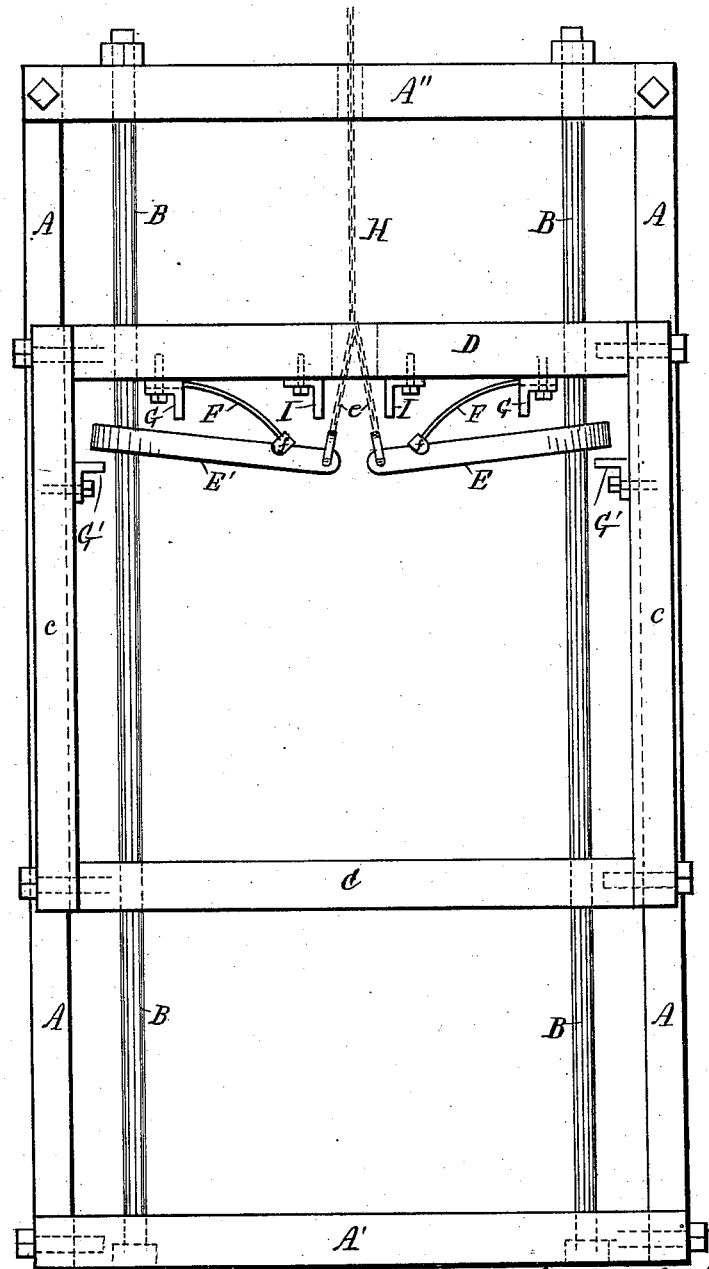

(No Model.)

C. A. HOFFNAGLE.
AUTOMATIC SAFETY BRAKE FOR ELEVATORS.

No. 299,543. Patented June 3, 1884.

2 Sheets—Sheet 1.

Witnesses.
D. C. Hanson
S. C. Fitzgerald

Charles A. Hoffnagle
Inventor.
by W. J. Fitzgerald (No Model.) 2 Sheets—Sheet 2.
C. A. HOFFNAGLE.
AUTOMATIC SAFETY BRAKE FOR ELEVATORS.
No. 299,543. Patented June 3, 1884.
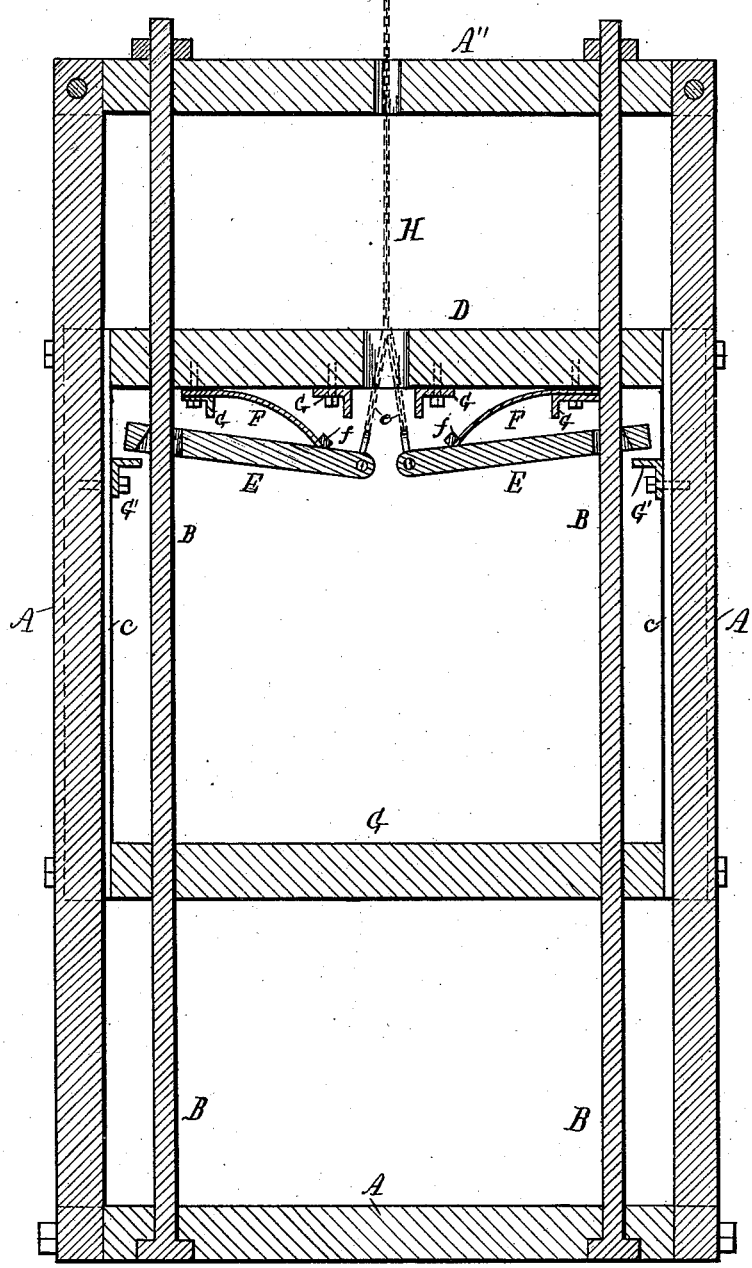
Fig. 4.
Witnesses
Charles A. Hoffnagle
Inventor
by W. T. Fitzgerald

UNITED STATES PATENT OFFICE.

CHARLES A. HOFFNAGLE, OF VERGENNES, VERMONT, ASSIGNOR OF ONE-HALF TO FREDERICK W. COE, OF SAME PLACE.

AUTOMATIC SAFETY-BRAKE FOR ELEVATORS.

SPECIFICATION forming part of Letters Patent No. 299,543, dated June 3, 1884.

Application filed December 3, 1883. (No model.)

*To all whom it may concern:*

Be it known that I, CHARLES A. HOFFNAGLE, a citizen of the United States, residing at Vergennes, in the county of Addison and State of Vermont, have invented certain new and useful Improvements in Automatic Safety-Brakes for Elevators; and I do hereby declare the following to be a full, clear, and exact description of the invention, such as will enable others skilled in the art to which it appertains to make and use the same.

The object of this improvement is to provide a self-acting safety-brake that will secure the hoisting-platform from premature or violent descent in case of breakage of the hoisting rope or chain, and thus prevent damage to life and property. This result is obtained by the mechanism illustrated in the drawings, herewith filed as part hereof, in which the same letters of reference denote the same parts throughout the several views.

Figure 3:
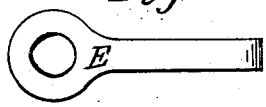

Figure 1 is a front elevation. Fig. 2 is a transverse section. Fig. 3 is a top view of the safety clutch or brake detached. Fig. 4 is a longitudinal section of the same.

A A A' A" represent the elevator-frame.

B B represent upright iron rods extending from the base A' to the top A" through the platform C c c and hoisting-beam D, and firmly secured at their ends by suitable means. The rods B B pass through steel brakes or clutch-bars E E', having oval-shaped slots beveled in opposite directions at the ends thereof. F F are strong steel springs, affixed to flanged plates G G', which are attached to the hoisting-beam. The flanged plates G G' operate as checks to the upward motion of the brakes E E'. Because of the tension of the springs F F and the brakes E E', their normal position is such as to lock the platform against downward motion, as will be hereinafter fully explained. The inner ends of the brakes E E' are connected by chains e, passing through beam D to hoisting rope or chain H.

I I are flanged plates projecting from the sides of the hoisting-frame C c c', and operate as fulcrums to bear the levers E E' out of contact with the rods B B as they are adjusted to a horizontal position preparatory to motion of the platform up or down. The flanged plates G G', attached to the hoisting-beam D, check the motion of the brakes E E' in proper position to clear the rods B B of the edges of the slots in the brakes, which is necessary to allow free motion of the elevator-platform.

The springs F F are provided at their ends with flanged plates *f*, which fit over the sides of the brakes, and thus prevent the springs from working out of bearing position. The parts or ends of the slots at the outer sides of the rods B B are beveled toward the rods, and their inner ends are beveled in an opposite direction. The inner or last-mentioned bevels allow the springs F F to throw the brakes E E' to the inclined position, as shown, and thereby bring the upper edges of the outer bevels against the corresponding sides of the rods B B, and such a positive bite or grip on the rods B B is thus obtained that downward motion of the platform is surely prevented. Weight on the platform adds to the security against its downward motion by intensifying the grip of the brakes E E' on the rods B B. Tension or draft on the hoisting-rope H will draw the brakes out of contact with the rods, which is necessary to motion. A failure to relieve the bearing of either of the brakes will prevent motion of the platform. As the brakes E E' are adjusted and held in position to allow motion by the operation of elevating or sustaining the platform, the instant the hoisting-rope is broken the brakes clutch the rods, as shown, and further change of position is prevented until the grip of the brakes on the rods is relieved intentionally.

Having explained the construction and operation of my improvement, what I claim as new, and desire to secure by Letters Patent, is—

In an automatic safety-brake for elevators, the steel brakes E E', provided with oval slots beveled inwardly from below, in combination with the rods B, springs F, flanged plates G', secured to the hoisting-frame sides C, and the hoisting-beam D, provided with flanged plates G and I, all constructed and arranged to operate substantially as specified.

In testimony whereof I affix my signature in presence of two witnesses.

CHARLES A. HOFFNAGLE.

Witnesses:
 JULIUS S. HICKOK,
 JOHN J. WRIGHT.